March 28, 1933.   C. E. STARR   1,903,247
METHOD FOR THERMAL DECOMPOSITION OF NATURAL GAS
Filed Sept. 2, 1930   2 Sheets-Sheet 1
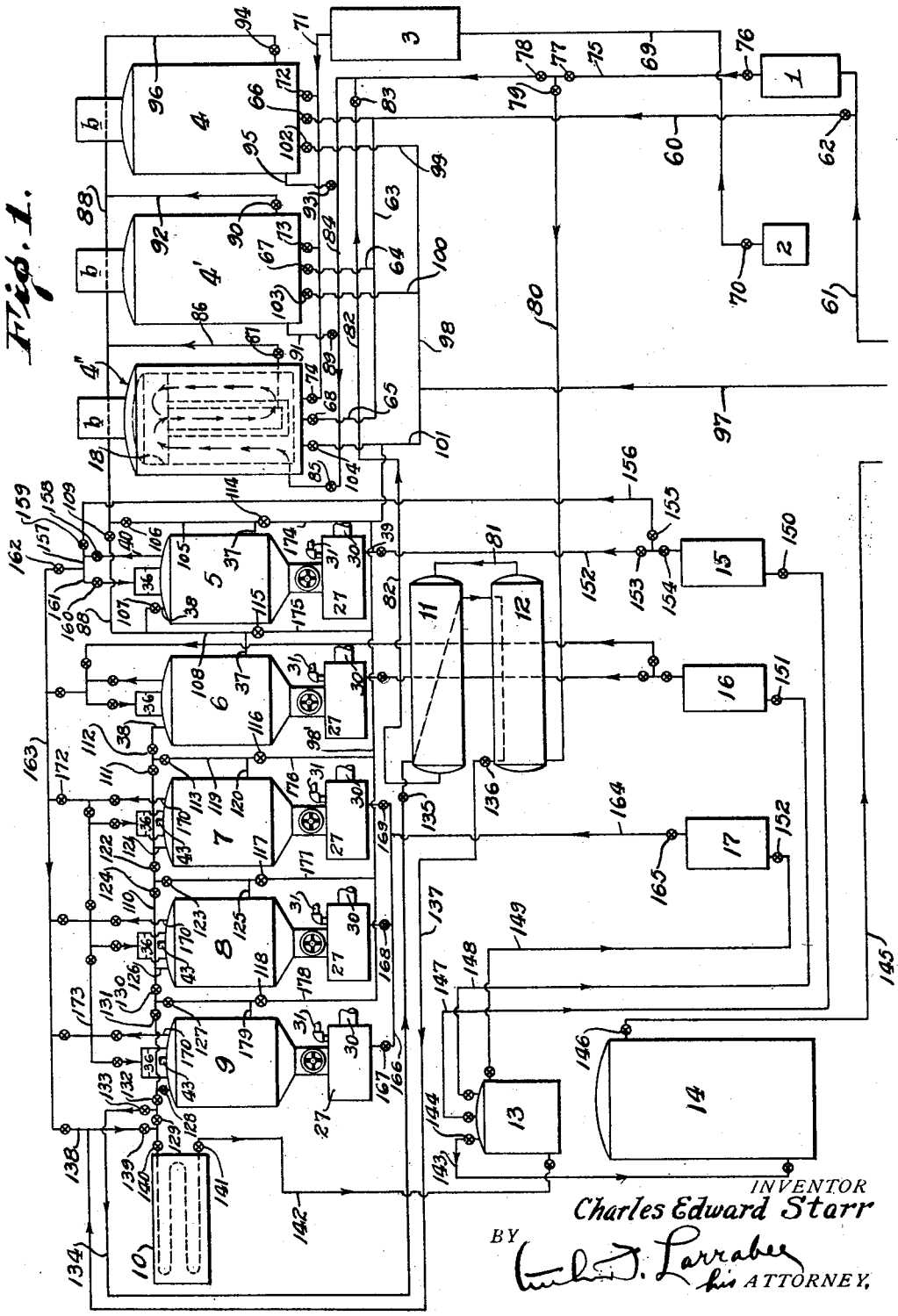
INVENTOR
Charles Edward Starr
BY
his ATTORNEY.

March 28, 1933.  C. E. STARR  1,903,247
METHOD FOR THERMAL DECOMPOSITION OF NATURAL GAS
Filed Sept. 2, 1930  2 Sheets-Sheet 2
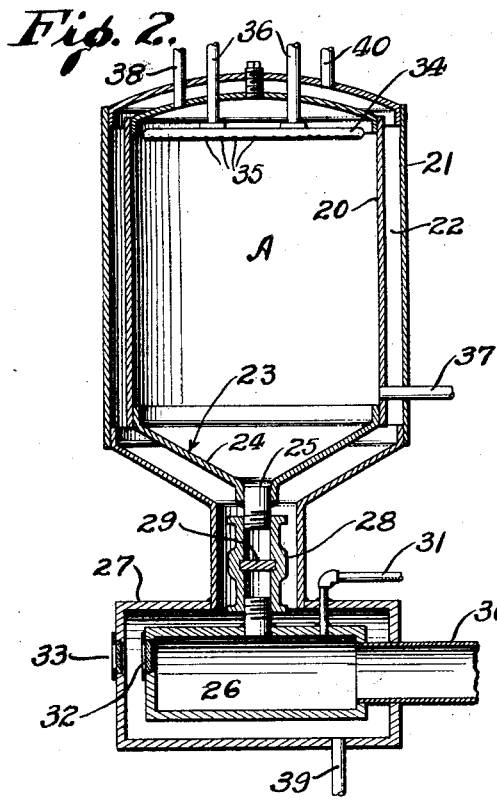
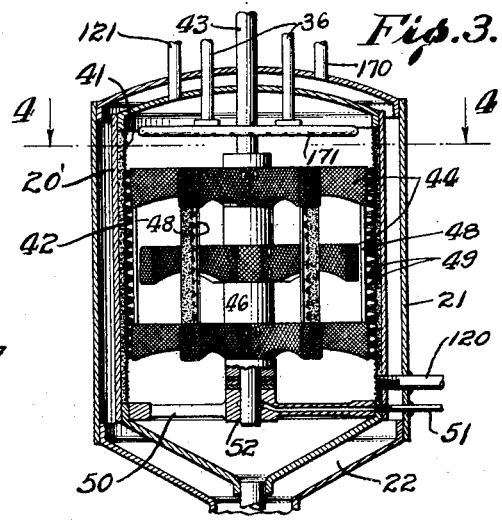
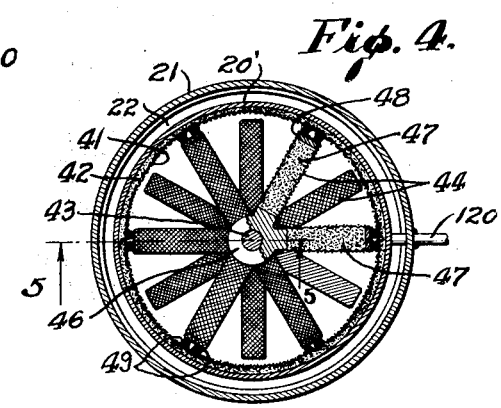
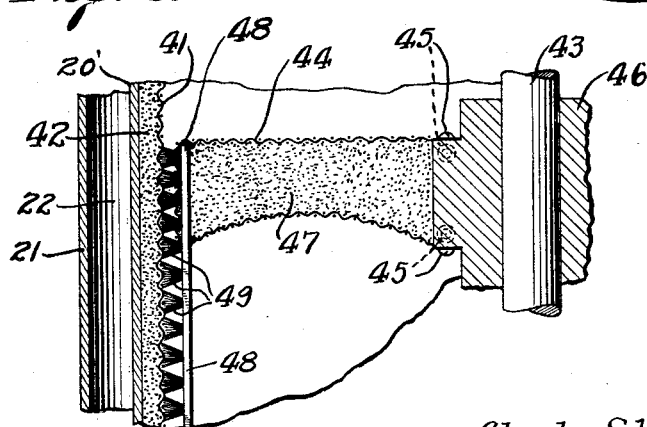
INVENTOR
Charles Edward Starr
BY
ATTORNEY.

Patented Mar. 28, 1933

1,903,247

UNITED STATES PATENT OFFICE

CHARLES EDWARD STARR, OF OMAHA, NEBRASKA

METHOD FOR THERMAL DECOMPOSITION OF NATURAL GAS

Application filed September 2, 1930. Serial No. 479,293.

This invention relates to a process and an apparatus for cracking of natural gas whereby hydrogen gas and carbon black in the natural gas is efficiently and economically obtained.

An object of the invention is to provide a novel apparatus and method for cracking natural gas whereby hydrogen gas of a very high degree of purity may be recovered from natural gas.

Another object of the invention is to provide a novel means and method whereby carbon black may be obtained or recovered from natural gas in sufficient quantities to make such process commercial.

Another object of the invention is to provide a novel apparatus and method of cooling cracked natural gas whereby the carbon black and hydrogen therein may be effectively saved so that such hydrogen gas and carbon black may be used in commercial quantities.

A further object of the invention is in the provision of novel means for the removal of the carbon black from my novel apparatus.

The invention resides in the various parts and combinations of parts as well as in the method of operation more particularly hereinafter set forth and claimed.

A feature of my novel apparatus and method resides in the provision of means whereby natural gas may be obtained from the oil fields where at present there is an abundant supply, and to satisfactorily crack such natural gas for the recovery of carbon black and hydrogen in commercial quantities, and at the same time, eliminating the obnoxious and detrimental gases and smoke nuisances heretofore prevalent in methods and apparatus now in use for the recovery of such products.

In many States at present there are laws requiring the conservation of natural gas, and operation of plants for the recovery of carbon black and hydrogen gas from such natural gas has been curtailed or limited due to the inefficient recovery of such products and the consequent wasteage of the natural gas; and an object of my invention is to provide a novel apparatus and method whereby hydrogen gas and carbon black may be recovered in sufficient quantities from natural gas so as to satisfactorily comply with conservation laws.

A still further object of my invention is in the provision of a novel apparatus and method for cracking natural gas whereby the time and temperature of the cracking process may be accurately and definitely controlled at each step of the process and in conjunction with each apparatus used in conjunction therewith.

Other objects, advantages, and features of invention may appear from the accompanying drawing, the subjoined detailed description and the appended claims.

The accompanying drawings illustrate the invention in a form I at present deem preferable.

Figure 1 is a more or less diagrammatic view showing the general arrangement of the apparatus and the lines connecting the same to effectively and efficiently carry out my novel process.

Fig. 2 is a transverse sectional view of a reaction chamber used in my novel combination of apparatus and process.

Fig. 3 is a view analogous to Fig. 2 but showing a transverse sectional view of a catalyzing tower used in my novel combination of apparatus and process.

Fig. 4 is a transverse sectional view on line 4—4, Fig. 3.

Fig. 5 is a fragmental sectional view on enlarged scale on line 5—5, Fig. 4.

In carrying out my invention, I at present deem it advisable to use the following apparatus, some of which is of standard construction, may be purchased on the open market, and others of which are new and novel and which are constructed particularly for carrying out my invention in the cracking of natural gas to recover carbon black and hydrogen free from contamination that would otherwise destroy its commercial value.

The equipment used in my apparatus comprises a natural gas charging compressor 1, an air blower 2, an air pre-heater 3, a series of thermal stoves 4, 4' and 4", a primary reaction chamber 5, a secondary reaction chamber 6, and a plurality of catalyzing towers comprising a primary catalyzing tower 7, a secondary catalyzing tower 8, and an auxiliary catalyzing tower 9, a condenser unit 10, heat exchangers 11 and 12, a hydrogen gas receiving tank 13, a gas holder or storage tank 14, a plurality of hydrogen gas compressors 15, 16 and 17.

Of the foregoing apparatus, all except the reaction chambers 5 and 6 and the catalyzing towers, 7, 8 and 9, may be of any suitable design such as now in common use and no claim is made to the specific structure of such apparatus, except in their relative arrangement in the combination herein described.

The natural gas charging compressor 1 is of such construction that it may be stepped to give a variable control of the volume and charging speed of the natural gas to the thermal stoves or furnaces 4, 4′, 4″.

The air blower 2 is utilized to force atmospheric air through the pre-heater 3 on its way to the thermal stoves 4, 4′, 4″ where it is utilized for combustion purposes.

The thermal stoves 4, 4′ and 4″ may be of any suitable construction having a refractory lining 18 that is pre-heated by any suitable means so that such stove will obtain a predetermined temperature about 1800 degrees F. for cracking natural gas introduced therein after the heating means is turned off. The run gas is thus decomposed into its elements, principally hydrogen and carbon.

The condenser unit 10 is used for cooling hydrogen gas introduced therein from the catalyzing towers after the same has previously been passed through the heating exchangers 11 and 12.

The heat exchangers 11 and 12 may be of any suitable design adapted to receive the relatively hot hydrogen gas from the final catalyzing tower and dissipate such heat which may be absorbed by the natural gas piped therethrough so as to aid in pre-heating such natural gas in its flow through my apparatus.

The hydrogen receiving tank 13 may be of any suitable design to receive a predetermined quantity of cold hydrogen gas from the condenser 10 and before such hydrogen gas is delivered to the storage tank 14, and from which it is distributed as hereinafter set forth.

The storage tank 14 may be of any suitable construction in which surplus hydrogen gas from the receiving tank 13 may be stored.

The hydrogen gas compressors 15, 16, and 17 may be of any suitable design and are adapted to receive cold hydrogen gas from the receiving tank 13 and distribute the same under regulatable control and with sufficient pressure above atmospheric to circulate such cold hydrogen throughout my apparatus as hereinafter described in sufficient volume and speed as desired.

The reaction chambers 5 and 6 are identical in construction and comprise an inner tank 20 that forms a chamber A which is surrounded by an outer tank 21 spaced from inner tank 20 so as to leave a space 22 between said tanks. The bottom of chamber A is closed by a bottom plate 23 that has downwardly converging walls 24 to form an outlet 25 that is connected to a carbon black receiving chamber 26 that is surrounded by a chamber 27 which is connected to outer tank 21 so as to form a continuation of space 22 so that such space entirely encloses the inner tank 20 and the carbon black receiving chamber 26.

A suitable gate valve 28 is interposed between outlet 25 in chamber 26 and is provided with the usual gate 29, the function of which will be hereinafter more fully explained.

An outlet 30 extends from chamber 26 so that carbon black received in said chamber may be withdrawn by any suitable means not shown. A pipe 31 is connected to chamber 26 and preferably extends to the combustion chambers in thermal stoves 4 under suitable valve control.

Suitable Pyrex peep-holes 32 and 33 are respectively provided in chambers 26 and 27 to permit the attendant to ascertain the quantity of carbon black deposited in the carbon black receiving chamber 26.

At the upper end of chamber A, a suitable spray header 34 is mounted and is provided with a series of perforations 35 through which cold hydrogen gas introduced through inlet pipes 36 may be sprayed upon the vapors of the cracked gas introduced into chamber A through the inlet pipe 37 and from which chamber A such vapors flow through outlet pipe 38. A pipe 39 opening into space 22 that extends between chambers 26 and 27 and between inner tank 20 and outlet tank 21 and space 22 is provided with an outlet pipe 40 through which said hydrogen gas is conducted to any suitable or desirable point as hereinafter described.

The catalyzing towers 7, 8 and 9 are identical in construction with the reaction chambers, except for the addition of a nickel plated screen 41 which is spaced a short distance from the inner tank 20′ and surrounds the inner periphery thereof, and the space 42 between said screen 41 and inner tank 20′ is filled with a suitable catalyzing agent such as powdered nickel. Axially mounted in inner chamber 20′ is a shaft 43 which may be rotated by any suitable means not shown.

Extending from shaft 43 are a plurality of blades or arms 44 that are preferably formed of nickel plated wire mesh that are enclosed on all sides and said arms are secured by any suitable means such as screws 43 to a hub 46 that is fixed to shaft 43. The space 47 between the wire mesh that forms said arms 44 is filled with a suitable catalyzing agent such as nickel powder.

The plurality of sets of arms 44 that extend from shaft 43 are shown as extending therefrom in a staggered relation with the top and bottom sets of arms being positioned in juxtaposition.

Scraping means such as a bar 48 is secured to the outer ends of pairs of arms 44, and bristles 49 extend therefrom to scrape any deposits of carbon black that may adhere to the wire mesh 41 so that such deposits will fall to the bottom of the chamber where they will be directed into the carbon black receiving chamber.

A suitable spider 50 is secured at the bottom of the catalyzing chamber to support shaft 43 and means 51 are provided for introducing a lubricant to properly lubricate shaft 43 in its bearing 52 formed in spider 50.

The inlet and outlet pipes described in connection with the reaction chambers 5 and 6 are duplicated in the catalyzing towers 7, 8 and 9 and the operation of the same will be hereinafter more fully set forth.

In operation, one of the thermal stoves 4 is heated by introducing a spray of natural gas which is introduced through lines 60 that is connected to the main supply line 61 under control of valve 62. Said line 60 is provided with a branch line 63 that extends to the remaining thermal stoves 4, by means of branch pipes 64 and 65. The admission of natural gas to stoves 4 is under control of valves 66, 67, and 68.

Air for combustion is supplied to the stoves 4 by means of the air blower 2 which is connected by a pipe 69 under control of valve 70 to the air pre-heater 3 which is maintained at a predetermined temperature by any suitable means contained within itself. Pre-heated air is delivered from the pre-heater 3 through pipe 71 to stoves 4 under control of valves 72, 73 and 74.

In starting my cracking plant in operation, one stove is supplied with gas and air in sufficient quantities to maintain the proper combustion. After such stove 4 is heated to a predetermined temperature of about 1800 degrees F., the gas and air are shut off so as to extinguish the flame in the stove, and the usual damper, (not shown) in the stack b is closed, after which natural gas to be cracked is introduced into such stove after the same has been passed through the heat exchangers 11 and 12 where such natural gas will be preheated before it is introduced into the thermal stove 4 where it contacts the hot refractory surface 18, thereby subjecting the natural gas to a cracking temperature so as to crack the same, or decompose it into its elements, principally hydrogen and carbon.

When the plant is first put into operation, the heat exchangers 11 and 12 will not transfer any heat to the natural gas passing therethrough but such period will only be for a short time, and the only ill effect will be in preliminarily cooling the thermal stoves at a more rapid rate than after the heat exchangers are in operation as will be described hereafter.

In order to cause the natural gas to pass through the heat exchangers 11 and 12 to the stove 4″, which for the sake of illustration will be considered the one in operation at this time, the valve 78 is closed and valves 77 and 79 are open, thereby permitting natural gas to flow from gas compressor 1 through pipe 75 and into pipe 80 into heat exchangers 12 from which such gas flows through pipe 81 into heat exchanger 11 and thence through pipe 82 through valve 83 which is open into pipe 84 through valve 85 and into thermal stove 4″ from which the cracked vapors pass through pipe 96 under control of valve 87 into line pipe 88.

While gas is being cracked in stove 4″, thermal stove 4′ is being fired so that its refractory material will attain a predetermined temperature, such firing is accomplished by admitting gas and pre-heated air thereto by opening valves 62 and 67 and closing valves 66 and 68 and opening valve 70 and 73 and closing valves 72 and 74. After stove 4′ has attained a predetermined temperature, the fire is extinguished in the same manner as set forth in connection with stove 4″ and when the temperature in stove 4″ is lowered by the cracking stock passing therethrough to a degree lower than a cracking temperature, valves 85 and 87 are closed and valves 89 and 90 are opened so as to introduce pre-heated gas to be cracked into thermal stove 4′ through pipe 91 and to permit such gas after being subjected to a cracking temperature to flow through valve 90 and pipe 92 into line pipe 88.

The stove 4 is pre-heated by opening valves 66 and 72 after which, when the temperature of stove 4′ is below a cracking temperature the gas is introduced into stove 4 by opening valves 93 and 94 and closing valves 89 and 90 so as to permit the gas to flow into stove 4 through pipe 95 and to permit the cracked gas to flow therefrom through pipe 96 into line pipe 88, after which the operation above described is repeated.

When it is necessary during the course of operation to purge the thermal stoves of any foreign substances or gases and for fire protection, steam may be introduced into the stoves at the times desired as will be apparent with those skilled in the art, through a steam line 97 which is connected to any suitable source of supply and such steam line 97 is connected to a header 98 from which branch lines 99, 100, 101 extend to thermal stoves 4, 4′ and 4″ respectively and each pipe 99, 100, 101 is respectively under control of a valve 102, 103 and 104.

After the nautral gas has been subjected to the cracking temperature in the thermal stoves and the same has been delivered to the header or pipe line 88, the cracked stock then enters the primary reaction chamber 5 through an inlet 37 which is connected to pipe 105 that extends from header 88 under control of valve 106.

The cracked stock, after entering the primary reaction chamber, is circulated through chamber A where it is subjected to a spray of cold hydrogen gas which shocks the cracked stock and precipitates the suspended carbon black to the bottom of the primary reaction chamber from which it passes into the carbon black receiving chamber 26. The vapors while passing through the primary reaction chamber are reduced to a predetermined temperature lower than the temperature obtained in the thermal stove, and the vapors then pass through outlet pipe 38 under control of valve 107 into line 108 which is connected to header 88 and to inlet 37 on the secondary reaction chamber. Valve 109 in header 88 is closed so as to prevent the vapors from going direct into the secondary reaction chamber without first passing through the primary reaction chamber, unless it is desired to by-pass the cracked stock from header 88 around the primary reaction chamber in which case valves 106 and 107 would be closed and valve 108 opened.

After the vapors have entered the secondary reaction chamber, they are again subjected to a spray of cold hydrogen gas admitted thereto through the spray header 34, thereby shocking the cracked stock at a lower predetermined temperature than that at which it was shocked in the primary reaction chamber to thereby further precipitate carbon black which may be suspended at such lower temperature. The vapors then flow through outlet 38 in secondary reaction chamber 6 and into a header 110 from which it is directed successively into one or more of the catalyzing towers 7, 8 and 9.

It is desirable to pass such vapors from the secondary reaction chamber successively into two of the catalyzing towers to effectively remove all the carbon black from the cracked stock introduced therein, leaving a hydrogen gas.

In order to direct the cracked vapors from the secondary reaction chambers 6 into the catalyzing tower 7, valve 111 is closed and valves 112 and 113 are opened (it being understood that at all times heretofore valves 114, 115, 116, 117 and 118 are closed and their purpose will be described later). The vapors from secondary reaction chamber 6 then pass through pipe 119 into inlet pipe 120 where the vapors are circulated and agitated so as to bring each particle thereof into contact with the catalyzing surfaces therein hereinbefore described as the projecting arms 44 and the screen surface 41. Such contact of the vapors with the catalyzing surfaces precipitates carbon black that may be suspended in the vapors and the scraping 49 removes such precipitating carbon black from the side walls of the catalyzing towers and such carbon black after precipitated will fall to the bottom of the catalyzing tower into the carbon black receiving chamber at the bottom thereof.

The vapors then pass from outlet pipe 121 through valves 122 and 123; valve 124 being closed, thereby directing the vapors into catalyzing tower 8 through inlet pipe 125 from which said vapors flow through outlet pipe 126, whereupon closing valves 127, 128 and 129, and opening valves 130, 131, 132 and 133, such vapors will be introduced into pipe line 134. During the passage of the vapors through the catalyzing towers, the same may be if desired, subjected to a supply of cold hydrogen gas to further aid in shocking the vapors in the event the temperature of the vapors is not lowered a sufficient degree by the cooling means hereafter described.

If it is desired to pass the vapors through the catalyzing tower 9, it will be apparent that the opening and closing of the valves indicated in Fig. 1 will accomplish such result, or in the event one of the catalyzing towers is in need of repairs or adjustment, the vapors may be directed through any one or two of the catalyzing towers desired.

The vapors delivered into pipe 134 will be in the form of hydrogen gas effectively purged of all carbon black, and will have a predetermined temperature depending upon the degree to which it has been previously cooled in the various steps of passing it through the reaction chambers and catalyzing towers, and such temperature is utilized by directing the hydrogen gas to heat exchangers 11 and 12 under control of valves 135, 136, thence through pipe 127 which is connected to a header 138 which connects with header 110 under control of valve 139 which together with valve 140, is opened and valve 129 being closed, the hydrogen gas will be directed to the condenser 10 where it is subjected to the cooling surfaces of the condenser so as to reduce the temperature of the hydrogen gas to the desired degree of chill. The hydrogen gas then flows from condenser 10 under control of valve 141 through pipe 142 into hydrogen receiving tank 13 which will maintain a predetermined volume, the surplus flowing through pipe 143 under control of valve 144 into the hydrogen storage tank 14 from which it may flow through distributing line 145 under control of valve 146 to any desired point of use.

Cold hydrogen gas is utilized as hereinbefore set forth in shocking the cracking vapors introduced into the reaction chambers and the catalyzing towers and also cold hydrogen gas is circulated around the reaction chambers and catalyzing towers so as to reduce the temperature of the cracked stock to the desired degree and carry off the heat dissipated from the cracked stock after it passes through the reaction chambers and the catalyzing towers. Such cold hydrogen gas is obtained from the hydrogen receiving tank 13 by means of lines 147, 148 and 149 that are respectively connected to hydrogen gas compressors 15, 16 and 17 under control of valves 150, 151 and 152 respectively.

Compressor 15 is connected to circulate cold hydrogen gas into and around primary reaction chamber 5, and compressor 16 is connected to circulate cold hydrogen gas into and around secondary reaction chamber 6, and compressor 17 is connected to circulate cold hydrogen gas into and around the three catalyzing towers 7, 8, and 9.

Compressor 15 is connected by pipe 152 to inlet pipe 39 under control of valves 153, 154 which are open and valve 155 in pipe 156 being closed, the cold hydrogen gas will circulate through space 22 and out of outlet pipe 40 which is connected to a header 157 under control of valve 158. Valve 159 in header 157 is closed and valve 160 in pipe 161 leading from header 157 being open, and valve 162 being closed the hydrogen gas circulated through space 22 will be directed into inlet pipes 36 from which it is emitted through spray openings 35 into the vapors in the primary reaction chamber from which it flows with the rest of the vapors therein through outlet 38 as hereinbefore described.

In the event it is not desired to circulate cold hydrogen gas around the primary reaction chamber, valve 153 is closed and valves 154 and 155 are opened and cold hydrogen gas will then flow from compressor 15 through pipe 156 and with valve 159 and 160 open, and with valves 158 and 162 closed, thence into inlet pipe 36 into the reaction chamber.

Valve 162 controls flow of gas from header 157 into header 163 from which such gas may be by-passed into the secondary reaction chamber or any one or all of the catalyzing towers as will be apparent to those skilled in the art, by opening and closing the requisite valves shown in the pipe lines.

The connection of compressor 16 with the space 22 and the spray header 34 in the secondary reaction chamber 6, as well as to the header 163 will be apparent from the foregoing description with respect to the connection of compressor 15, and for the sake of brevity, will not be herein set forth in full.

Compressor 17 is connected by pipe 164, controlled by valve 165 to a header 166 that has branch pipes connected to the space 22 around each catalyzing tower 7, 8 and 9, such branch pipes being respectively under control of valves 167, 168 and 169 and the circulation of such hydrogen gas from outlets 170 into the spray 171 in each catalyzing tower will be apparent, or in the event hydrogen gas for such spray is desired from an additional source, such may be obtained by opening valve 172 to permit gas flow from header 163 to header 173 from which it may be directed into the spray system.

If it is desired to purge either the primary or secondary reaction chambers or any one or all of the catalyzing towers, the steam header pipe 98 is extended into a header pipe 98' from which branch pipes 174, 175, 176, 177 and 178 extend and are connected to inlet pipes 37, 120, 125 and 179. Such branch pipes 174, 175, 176, 177 and 178 are under control of valves 114, 115, 116, 117 and 118 respectively, and when it is desired to introduce steam into reaction chamber 5, valves 106 and 107 are closed and valve 114 opened. When it is desired to introduce steam into the secondary reaction chamber, valves 107, 109 and 112 are closed and valve 115 opened.

When it is desired to introduce steam into catalyzing tower 7, valves 113 and 122 are closed and valve 116 opened. When it is desired to introduce steam into catalyzing tower 8 valves 123 and 130 are closed, and valve 117 opened. When it is desired to introduce steam into catalyzing tower 9, valves 127 and 128 are closed, and valve 118 opened.

When it is desired to remove carbon black from the carbon black receptacle or receiving chamber 26, the gate valve 29 associated with such receptacle if it is desired to be emptied, is first closed, and in order to eliminate any danger of hydrogen gas that may remain in chamber 26 after gate valve 29 is closed, from exploding or otherwise combusting, I prefer to by-pass such gas through the valve controlled vent line 31 to a source of combustion such as the thermal stoves combustion chamber that is in operation at the time. The carbon black may then be removed with safety by any suitable means.

The construction of the reaction chambers and the catalyst towers shown and described herein are not specifically claimed herein, but I reserve the right to file a separate application covering the construction thereof.

From the foregoing it will be seen that I have subjected natural gas to a cracking temperature in the thermal stoves, then successively passed such cracked natural gas through a series of successive steps wherein the cracked vapors are subjected to various predetermined lowered temperatures, and each change of temperature precipitating carbon black suspended in the cracked vapors, thereby obtaining at each successive step, different grades and qualities of carbon black so that at the final chilling step, the finer particles of carbon black are removed, leaving as the residue hydrogen gas which is commercially pure.

As each reaction chamber and catalyst tower is provided with a separate carbon black receptacle, the various grades of carbon black obtained are easily segregated for market purposes.

I claim:

1. The method of cracking natural gas which method comprises pre-heating natural gas; then subjecting such pre-heated natural gas to a cracking temperature to crack the same; then passing such cracked stock through a series of chambers each having a temperature lower than the cracking temperature; then shocking such cracked stock in each chamber, the shocking medium in some of the chambers being cool hydrogen gas; and then removing carbon black from such shocked stock.

2. The method of cracking natural gas which method comprises first heating a chamber to a cracking temperature; then closing such chamber to the atmosphere; then passing natural gas through such chamber to crack the same; then shocking such cracked natural gas at predetermined lowered temperatures with cool hydrogen gas; and then withdrawing precipitated carbon black.

3. The method of cracking natural gas which method comprises subjecting natural gas to a cracking temperature; then passing cracked natural gas through a series of chambers, each having a different temperature than the other; then shocking such cracked gas in such chamber with cool hydrogen gas; and withdrawing precipitated carbon black from each chamber.

4. The method of cracking natural gas which method comprises subjecting natural gas to a cracking temperature in a chamber closed to the atmosphere; then introducing such cracked vapors above atmospheric pressure into a chamber having a temperature below a cracking temperature; then shocking such cracked vapors in such chamber with cool hydrogen gas; and then subjecting such cracked vapors to a catalyzing agent.

5. The method of cracking natural gas which method comprises subjecting natural gas to a cracking temperature in a chamber closed to the atmosphere; then introducing such cracked vapors above atmospheric pressure into a chamber having a temperature below a cracking temperature; then shocking such cracked vapors in such chamber with cool hydrogen gas; and then subjecting such cracked vapors to a catalyzing agent in a chamber having a temperature lower than the chamber in which said vapors are shocked.

6. The method of cracking natural gas which method comprises subjecting natural gas to a cracking temperature in a chamber closed to the atmosphere; then introducing such cracked vapors above atmospheric pressure into a chamber having a temperature below a cracking temperature; then shocking such cracked vapors in such chamber; then subjecting such cracked vapors to a catalyzing agent in a chamber having a temperature lower than the chamber in which said vapors are shocked; and shocking said vapors while subjecting said vapors to said catalyzing agent.

7. The method of obtaining hydrogen gas from natural gas which method comprises subjecting natural gas to a cracking temperature to crack the same; then subjecting such cracked vapors above atmospheric pressure to temperatures of successively lower predetermined degrees; then shocking such cracked vapors at certain of said predetermined lower temperatures to precipitate carbon black suspended in such vapors; then passing such vapors over a catalyzing agent; and then shocking such vapors while being subjected to temperatures of successively lower degrees.

8. The method of obtaining hydrogen gas from natural gas which method comprises subjecting natural gas to a cracking temperature to crack the same; then passing such cracked vapors through a chamber having a temperature lower than a cracking temperature; then circulating a cooling medium around said chamber; then passing such vapors through a chamber cooled by a cooling medium and passing such vapors while in said last mentioned chamber over a catalyzing agent, of powdered nickel.

9. The method of obtaining hydrogen gas from natural gas which method comprises subjecting pre-heated natural gas to a cracking temperature; then passing such cracked vapors through chambers having temperatures of successively lower predetermined degrees; shocking such vapors at certain of said lower predetermined degrees; then subjecting such cracked vapors to a catalyzing agent; removing carbon black precipitated at such lower degrees; then utilizing the resultant product to pre-heat the natural gas to be cracked; and then cooling the resultant product, then passing such cooled product around the cracked vapors while such cracked vapors are being subjected to certain of said lower predetermined temperatures.

10. The method of obtaining hydrogen gas from natural gas which method comprises subjecting pre-heated natural gas to a cracking temperature; then passing such cracked vapors through chambers having temperatures of successively lower predetermined degrees; shocking such vapors at certain of said lower predetermined degrees; then subjecting such cracked vapors to a catalyzing agent; removing carbon black precipitated at such lower degrees; then cooling the resultant product.

11. The method of obtaining hydrogen gas from natural gas which method comprises subjecting pre-heated natural gas to a cracking temperature; then passing such cracked vapors through chambers having temperatures of successively lower predetermined degrees; shocking such vapors at certain of said lower predetermined degrees; then subjecting such cracked vapors to a catalyzing agent; removing carbon black precipitated at such lower degrees; then cooling the resultant product; then passing such cooled product around the cracked vapors while such cracked vapors are being subjected to certain of said lower predetermined temperatures.

12. The method of obtaining hydrogen gas which method comprises subjecting natural gas to a cracking temperature to crack the same, then subjecting such cracked vapors to temperatures of successively lower degrees to precipitate carbon black suspended in such vapors at each successive step; then spraying a spray of cold hydrogen gas upon said cracked vapors at certain of said lower temperatures.

In testimony whereof, I have hereunto set my hand at Los Angeles, California, this 30th day of August, 1930.

CHARLES EDWARD STARR.